2,887,385
FLAVOR

Irving I. Rusoff, Park Ridge, N.J., assignor to General Foods Corporation, White Plains, N.Y., a corporation of Delaware No Drawing. Application March 6, 1958
Serial No. 719,477

15 Claims. (Cl. 99—140)

This invention relates to artificial chocolate flavor and to a process for making the same. More particularly, the invention is concerned with an artificial chocolate flavor component which may be used as a base flavor factor in combination with other flavor factors such as astringency, bitterness, and the like, or which may be used alone and without such other factors to enhance the flavor of natural chocolate products. This application relates to the subject mater of my co-pending application, Serial No. 655,200, filed April 26, 1957, now Patent No. 2,835,592, and is thus a continuation-in-part of that co-pending application.

Flavor derived from cacao for manufacture of chocolate and cocoa products involves numerous widely separated and distinct steps commencing at the plantations in tropical environs and continuing until incorporation of the flavor in a finished product which can be a confectionery, beverage, or like food product. From the time cacao seeds are removed from their pods and are subjected to well-known processes which include fermentation, drying, grading, etc., obscure chemical reactions take place that condition the beans for roasting, during which the characteristic flavor of chocolate is developed. While progress has been made in the art of developing natural chocolate flavor, the processes involved require a high degree of control and are widely separated, the flavor varies with the source of the cacao, and the cost is excessive.

The invention has for its primary object the elimination of reliance on cacao as the sole source of chocolate flavor by development of such flavor from a wide variety of other raw materials.

It has been discovered that partially hydrolyzed hemp proteins can be reacted with reducing sugars and precursors thereof to provide an imitation or artificial chocolate flavor component which may be used as the base flavor factor. By "base flavor factor" is meant a flavor component which may be used in combination with bitterness, astringency and other flavor factors to provide an imitation or artificial chocolate flavor. The base flavor factor may also be employed to enhance the flavor of natural chocolate products. The base flavor factor provides fullness and body which levels out and prolongs the taste sensation.

The reaction to develop the above-described base flavor factor is carried out by the application of heat to a mixture of the reagents at a temperature and for a time sufficient to produce the base flavor factor in a substantially anhydrous condition at least at the end of the reaction. The reaction is carried out at a temperature of 90°–130° C. where the saccharide is a pentose; 120°–150° C. where the saccharide is selected from the group of hexoses and reducing polysaccharides; and 140°–170° C. where the saccharide is a non-reducing polysaccharide which is a precursor of a reducing saccharide, the time for such reaction varying inversely with temperature. Any one of a number of well-known apparatus may be employed to carry out the reaction such as a spray drier, a pan roaster, a drum drier, and the like. The reaction which results in the production of the base flavor component appears to be accompanied by a substantial decrease in the measurable amino nitrogen and reducing sugars in the reaction mixture.

The hemp protein degradation technique employed herein to produce the partially hydrolyzed protein may be enzymatic, acidic, or alkaline, although it is preferred for the purpose of the present process that enzymatic or acidic hydrolysis be utilized. Of these hemp protein hydrolysis methods that which is most preferred is the one employing enzymes. Such enzymes include the proteolytic enzymes such as trypsin, rennin, pepsin, erepsin, papain, bromolin, and the like. The use of alkaline degradation of the protein frequently results in the development of undesirable off-flavors in the final product, the artificial base flavor factor. Both alkaline and acid degradation are more difficult to control as compared with the enzyme degradation, require expensive, corrosion-proof equipment and, moreover, in some cases destroy certain amino acids which as set forth hereinafter are desired from the standpoint of obtaining best results. The degree of hydrolysis or proteolysis required in the present invention is substantially between 8% and 70%; viz., 8–70% of the total nitrogen in the hydrolyzate is amino nitrogen. Generally, it has been found that as the degree of proteolysis increases, the flavor intensity of the base flavor factor also increases.

It is believed that the degree of hemp protein hydrolysis employed as described above is such that the peptides in the protein hydrolyzates are di-, tri-, and the somewhat more complex peptides which can best be described as "oligopeptides." The term "oligopeptides" is employed herein to denote di-, tri-, and up to penta- and hexapeptides. It has been found that substantially unhydrolyzed proteins on the one hand and amino acids on the other hand are incapable of reaction with the reducing sugars to provide the base flavor factor and that partially hydrolyzed protein is essential to provide said factor; best results are obtained with oligopeptides. However, some amino acids such as alpha-amino-n-butyric acid, histidine, alanine, arginine, aspartic acid, glycine, glutamic acid, valine, phenylalanine, proline, lysine, iso-leucine, leucine, threonine, tyresine, and tryptophane, when present at the time of reacting the oligopeptides with the reducing sugars result in a considerably enhanced base flavor factor. Of these amino acids, phenylalanine and threonine are particularly preferred.

The above-specified operable range of partial hydrolysis for hemp proteins, viz., 8–70%, is an expression of the percent hydrolysis within which the hemp proteins tested have been found to yield the base flavor factor under the reaction conditions of the present invention. However, optimum results are obtained at 45–55% hydrolysis.

As indicated herein, percent hydrolysis is intended to mean the percent of total nitrogen which is amino nitrogen, the former being determined by the Kjeldahl method and the latter being determined by the formol method.

In the work described herein, amino nitrogen was determined by the method described in David M. Greenberg's "Amino Acids and Proteins," Charles C. Thomas, Springfield, Illinois (1951) on pages 80, 81 and 246. Another formol titration method is that developed by Sorenson and described in the "Official Methods of Analysis of the Association of Official Agricultural Chemists," 7th ed., A.O.A.C., Washington, D.C. (1950), on page 365. Generally, in the case of pure proteins, formol nitrogen determination by the Greenberg method can be converted to Sorenson values by multiplying the Greenberg values by the factor 0.56. With proteins in a highly buffered system such as cows' milk, this conversion factor cannot be employed because values provided by the two different methods of analysis do not differ proportionately as they do with pure protein.

The hemp protein hydrolyzate may be reacted with any suitable reducing saccharide, that is, a saccharide capable of reducing Fehling's solution to give cuprous oxide, or with any suitable precursor thereof, which expression includes all saccharides and other materials that provide a reducing saccharide or saccharides under the conditions of the reaction. These precursor materials consist mainly of those di- and polysaccharides which undergo molecular cleavage to yield reducing saccharides, such as the disaccharide, sucrose; the trisaccharide, raffinose; the polysaccharide material, dextrin, which of itself comprises both reducing saccharides and precursors thereof; etc. The reducing saccharides include all monosaccharides, disaccharides of the gentiobiose type, the trisaccharide manninotriose, etc. In addition, certain saccharic materials can be used which are derived from or closely related to the monosaccharides and have similar reducing properties, such as the "-uronic" acid, galacturonic acid; the desoxy sugar, rhamnose; and the pentaacetate of galactose. Thus the term "reducing saccharide" as used in the claims will be understood to include all of the reducing saccharide and saccharic compounds and precursors which provide reducing saccharide or saccharic compounds under the conditions of the reaction by degradation of the molecule or in any other manner.

Generally, the reducing sugar and the hemp protein hydrolyzate may be reacted in widely varying proportions by weight. The amount of reducing sugar may range, for example, from 5–150% by weight of the protein hydrolyzate and excellent results will be obtained. In the case of monosaccharides like glucose, base flavor factor is obtained in the range of 5–20% glucose by weight of edestin hydrolyzed to 50%, optimum flavor being derived at levels of glucose between 5–15%.

The temperature and time of reaction depend on the nature of the reactants, particularly the saccharide. For example, the greater reactivity of the monosaccharides make possible the use of lower temperatures without requiring excessive heating periods, whereas, in the case of less reactive disaccharides it is desirable to employ higher temperatures.

The useful saccharide materials can be divided into the following groups according to the preferred temperature ranges of the reaction, although it will be understood that the stated limits of these preferred ranges are not necessarily the minimum or maximum temperatures at which some useful results can be secured.

(1) The pentoses, including aldopentoses, methyl pentoses, ketopentoses, etc. Examples are xylose, arabinose and rhamnose. For this group, the preferred temperature range of the reaction is from 90° C. to about 130° C.

(2) The hexoses and reducing polysaccharides. In common with the pentoses of group 1, these reducing saccharides of group 2 have reactive aldehyde or ketone groups which are free to participate directly in the reaction with the protein hydrolyzates, but are less reactive than the pentoses so that the preferred temperature range for the reaction is approximately from 120° C. to 150° C. Examples are the aldohexoses such as glucose, galactose and mannose; the ketohexoses such as levulose and sorbose; reducing disaccharides such as lactose and maltose and other disaccharides of the gentiobiose type; the reducing trisaccharide manninotriose; etc. With this group may also be classified saccharide mixtures such as corn syrup and malt syrup which contain both dextrose and maltose, and invert sugar which contains dextrose and levulose. In addition, such saccharic materials as galacturonic acid and the pentaacetate of galactose can be used in this temperature range.

(3) Non-reducing polysaccharides which are precursors of reducing saccharides, as explained above. In this group, the temperature must be high enough in the first place to cause the formation of the reducing saccharide, and the preferred temperature range is approximately 140° C. to 170° C. Examples are the polysaccharides sucrose, dextrin and raffinose.

As indicated above, the reagents are heated at a temperature and for a time sufficient to create a substantially anhydrous condition at least at the end of the reaction. It appears that the properly mixed reactants require removal of sufficient quantities of water to provide a substantially anhydrous somewhat molten mixture for roasting to develop the artificial chocolate flavor of the present invention. However, the term "substantially anhydrous" is not meant to exclude the presence of some water in solution. In fact, a small amount of water is formed continuously during the course of the reaction, which fact alone is sufficient to preclude a completely anhydrous molten state at the end of the reaction. No analytical methods are available which permit determining with accuracy the maximum amount of water permissible at the end of the reaction. Good results have been obtained when the end product at the reaction temperature contained sufficient moisture to render it more or less tacky in nature, and I believe that as much as 5–10% moisture may have been present in some of such cases. These figures cannot be determined definitely, however, and in practice it is satisfactory to observe the rule that the product upon cooling to room temperature is substantially solid and substantially dry to the touch. The term "substantially anhydrous" is to be understood to include the presence of moisture within this limitation.

As aforementioned, the base flavor factor of the present invention can be combined with various other flavor factors of chocolate such as bitterness, astringency, aroma, and like factors in the preparation of an artificial chocolate flavor. The bitterness, astringency, aroma, and like factors, whether employed alone or in combination, fail to provide an artificial chocolate flavor but when one or more of these factors is combined with the base flavor factor of the present invention the taste sensation is leveled off and prolonged because of the fullness and body provided by the base flavor factor. The base flavor factor can be regarded as a background against which the more distinctive flavor factors such as bitterness, astringency, aroma and the like can be better appreciated.

Bitterness may be provided by the addition of bitter alkaloids such as caffein, theobromine, quinine, and the like. Other bitterness flavor factors that may be employed are the bitter polyacetates of polyhydric compounds such as the monosaccharides, glucose and levulose; the disaccharides, sucrose, lactose and maltose; the polyhydric alcohols, such as sorbitol and mannitol. Included in this class of bitterness factors are sucrose octaacetates, glucose triacetate, glucose tetraacetate, glucose pentaacetate, levulose triacetate, levulose tetraacetate, levulose pentaacetate, maltose octaacetate, sorbitol hexaacetate. Generally, the beta isomer of the polyacetates is much more bitter than the alpha isomer. Another class of bitterness flavor factors which may be employed are the bitter glucosides, such as quassin, naringin, the alpha-phenol-glucoside, beta-phenol-glucoside, 2,3,5,6-tetra-acetyl-alpha-phenol-glucoside, 2,3,5,6-tetra-acetyl-beta-phenol-glucoside, 2,3,5,6-tetra-acetyl-alpha-methyl-glucoside, 2,3,5,6-tetra-acetyl-beta-methyl-glucoside. Still another group of bitterness flavor factors are the bitter acetonylated sugars such as diacetone-glucose, 3-acetyl-diacetone-glucose, 3-acetyl-monoacetone-glucose, 3-benzoyl-diacetone-glucose, and 6-benzoyl-monoacetone-glucose. Still another class of bitter flavor factors are salts and esters of inorganic acids such as dulcitol pentanitrate, potassium sulfate, iso-amyl potassium sulfate, methyl-hexylcarbinol potassium sulfate.

Astringency may be provided by employing various tannins or tannates obtained by infusion or evaporation from wood, leaves or fruit of plants, e.g., extracts of the heartwood of acacias such as acacia catechu and acacia catechu sundra which are broadly referred to in the trade as "cutch," and the galls of oak, sumac, etc. Such astringency factors are generally water-soluble and include catechin having the formula $C_{15}H_{14}O_6$. Included in this class of compounds are dl-catechol, d-catechol and d-epi-catechol. Among some of the useful commercially available astringency factors are various powdered products such as cocoa tannins, catechu gum, gambir gum, rhatany root, eyebright herb, white oak bark, witch hazel bark, quebracho wood extract, chestnut leaves, red oak bark, black kino gum and gum myrrh. Other astringent materials include the alums such as sodium, potassium, ammonium, and like alums.

Chocolate aroma materials that can be employed in combination with the base flavor factor of the present invention, preferably along with the bitterness and astringency flavor factors described above, include aromatic materials derived from chocolate liquor, cocoa beans, cocoa powder by distillation, solvent extraction, and the like. In order to have a completely artificial chocolate flavor, however, one may employ a mixture of oil of coriander, vanillin, ethyl vanillin, oil of nutmeg, cinnamon and other essential oils which provide an aromatic principle similar to that of natural chocolate.

The base flavor factor resulting from the process of the invention is usually a powdery, friable material which is soluble in aqueous medium such as water, milk, and the like. The product is capable of incorporation into a number of food products, either as the base flavor factor in an artificial chocolate flavor or to enhance the flavor of natural chocolate. The base flavor factor of the present invention alone or with other flavor factors of chocolate can be included in a wide variety of confectionery products such as chocolate bars, candy coatings, cocoa powders for milk drinks and baked goods. Advantageously, the product may be combined with fats such as cocoa butter or with other fats and oils.

The following example illustrates an embodiment of the invention, but it is to be understood that this example is for purposes of illustration and that the invention is not limited thereto, since various changes can be made by those skilled in the art without departing from its scope and spirit.

The following compositions were thoroughly mixed in a 50 cc. beaker:

| Reaction ingredients: | Percent composition |
| --- | --- |
| Hemp protein (edestin) hydrolyzate (50% hydrolysis) (acidic) | 45.0 |
| Tannins | 25.8 |
| Arabinose | 3.3 |
| Glucose | 3.3 |
| Fructose | 3.3 |
| Theobromine | 13.0 |
| Caffein | 6.5 |

Hemp protein was hydrolyzed for a 24 hour period in 9 N sulfuric acid. At intervals, samples were removed from the hydrolysis mixture to determine the degree of degradation by the above stated formol method. When 50% hydrolysis (amino nitrogen/total nitrogen=0.5) was reached, barium hydroxide was added to pH of 7 to remove the sulfuric acid.

To the above mixture of ingredients 30% water was added until a pasty consistency was obtained. The mixture was then heated for 8 minutes at approximately 130° C. in an oil bath and yielded a dark brown, water-soluble, friable substantially anhydrous mass. 0.5 gm. of the powdered product was dissolved in 100 ml. of whole milk containing 5 gms. of sucrose to provide a chocolate flavored milk drink. Alternatively, the hemp protein hydrolyzate and the reducing sugars arabinose, glucose and fructose may be reacted in the oil bath to provide the base flavor factor, the tannins, theobromine and the caffein being added after the reaction to provide the desired artificial chocolate flavor.

The base flavor factor of the present invention may be employed in the enhancement of natural chocolate products such as coatings using, for example, the following procedure. 32 lbs. of chocolate liquor, 15 lbs. of cocoa butter, 45 lbs. of coating sugar, 3.5 lbs. of skim milk powder, and 2 lbs. of the base flavor factor of the present invention as provided, for example, by the process above, are mixed in a regular chocolate blender heated at a temperature of 120° F., said mixing requiring about 20 minutes. On the other hand, a melangeur may be employed in place of the aforementioned blender. The blended material is then ground in a 5-roll grinder or refiner, and the liquor is then conched for about 36 hours after which additional cocoa butter is added to reduce viscosity if desired.

Another unique advantage of the present invention is that the reaction to develop the base flavor factor may be carried out using reagents which are found in hemp. Thus, the base flavor factor can be obtained from a single raw material by hydrolyzing the hemp protein (with acid or enzyme); the saccharide is present in the hemp as hemp starch, which can be hydrolyzed (e.g., by acid) to give glucose; the digest can then be reacted at an elevated temperature, preferably between 120°–150° C., and the base flavor factor developed in this manner presents a convenience of operation which offers a substantial economic saving, when large quantities of the base flavor factor are being prepared. However, if it is so desired, the base flavor factor may be prepared by combining the hydrolyzate of the protein with the isolated saccharide.

It will be understood that while the invention has been described in part by means of specific examples, reference should be had to the appended claims for a definition of the scope of the invention.

What is claimed is:

1. A process for producing a chocolate base flavor factor comprising reacting a partially hydrolyzed hemp protein with a saccharide by the application of heat to a mixture of the reagents at a temperature and for a time sufficient to produce said base flavor factor in a substantially anhydrous condition at least at the end of the reaction, the reaction being carried out at a temperature of 90°–130° C. where the saccharide is a pentose; 120°–150° C. where the saccharide is selected from the group of hexoses and reducing polysaccharides; and 140°–170° C. where the saccharide is a non-reducing polysaccharide which is a precursor of a reducing saccharide.

2. The process of claim 1 in which the protein is hydrolyzed to 8–70%.

3. The process of claim 1 in which the reducing saccharide is a pentose and the reaction is carried out at a temperature within the range of 90–130° C.

4. The process of claim 1 in which the reducing saccharide is a polysaccharide and the reaction is carried out at a temperature within the range of 120°–150° C.

5. The process of claim 1 in which the reducing saccharide is a non-reducing polysaccharide which is a precursor of a reducing saccharide formed under the conditions of the reaction and the reaction is carried out at a temperature within the range of 140°–170° C.

6. The process of claim 1 in which the reducing sugar is glucose.

7. An artificial chocolate flavor which comprises in combination the base flavor factor of claim 1 and a bitterness flavor factor.

8. A cacao material of enhanced chocolate flavor which comprises in combination the base flavor factor of claim 1 and chocolate liquor.

9. An artificial chocolate flavor which comprises in combination the base flavor factor of claim 1 and a bitter polyacetate of a polyhydric compound selected from the group consisting of sugars and polyhydric alcohols.

10. The process of claim 1 in which the protein is hydrolyzed to 45–55%.

11. An artificial chocolate flavor which comprises in combination the base flavor factor of claim 1 and an astringent flavor factor.

12. An artificial chocolate flavor which comprises in combination the base flavor factor of claim 1, a bitterness flavor factor and an astringent flavor factor.

13. The process of claim 1 in which the reaction between the partially hydrolyzed protein and the saccharide is carried out in the presence of an amino acid selected from the group consisting of alpha-amino-n-butyric acid, histidine, alanine, arginine, aspartic acid, glycine, glutamic acid, valine, phenylalanine, proline, lysine, iso-leucine, leucine, threonine, tyresine, and tryptophane.

14. A process for producing a chocolate base flavor factor from a hemp product containing hemp protein and a saccharide precursor which comprises hydrolyzing the hemp protein 8–70%, hydrolyzing the saccharide precursor to glucose, and reacting a substantially anhydrous mixture of said hydrolyzed hemp protein and said glucose at a temperature of approximately 120°–150° C. to develop the chocolate base flavor factor.

15. The product of the process of claim 1.

References Cited in the file of this patent

UNITED STATES PATENTS

| | | |
|---|---|---|
| 2,103,495 | Ruckdeschel | Dec. 28, 1937 |
| 2,364,008 | Stuart | Nov. 28, 1944 |
| 2,414,299 | Hall | Jan. 14, 1947 |
| 2,590,646 | Pettibone | Mar. 25, 1952 |

FOREIGN PATENTS

| | | |
|---|---|---|
| 107,367 | Great Britain | Mar. 18, 1918 |

OTHER REFERENCES

"The Chemical Senses" by Moncrieff, Leonard Hill Limited, 17 Stratford Place W1, London, 1944, pp. 109, 110, 196 and 239.

"The Chemistry and Technology of Food and Food Products" by Jacobs, second edition, Interscience Publishers, Inc., New York, 1951, page 1649.